J. Bennett,
Water Wheel,
7,197 X
Patented Aug. 10, 1832.
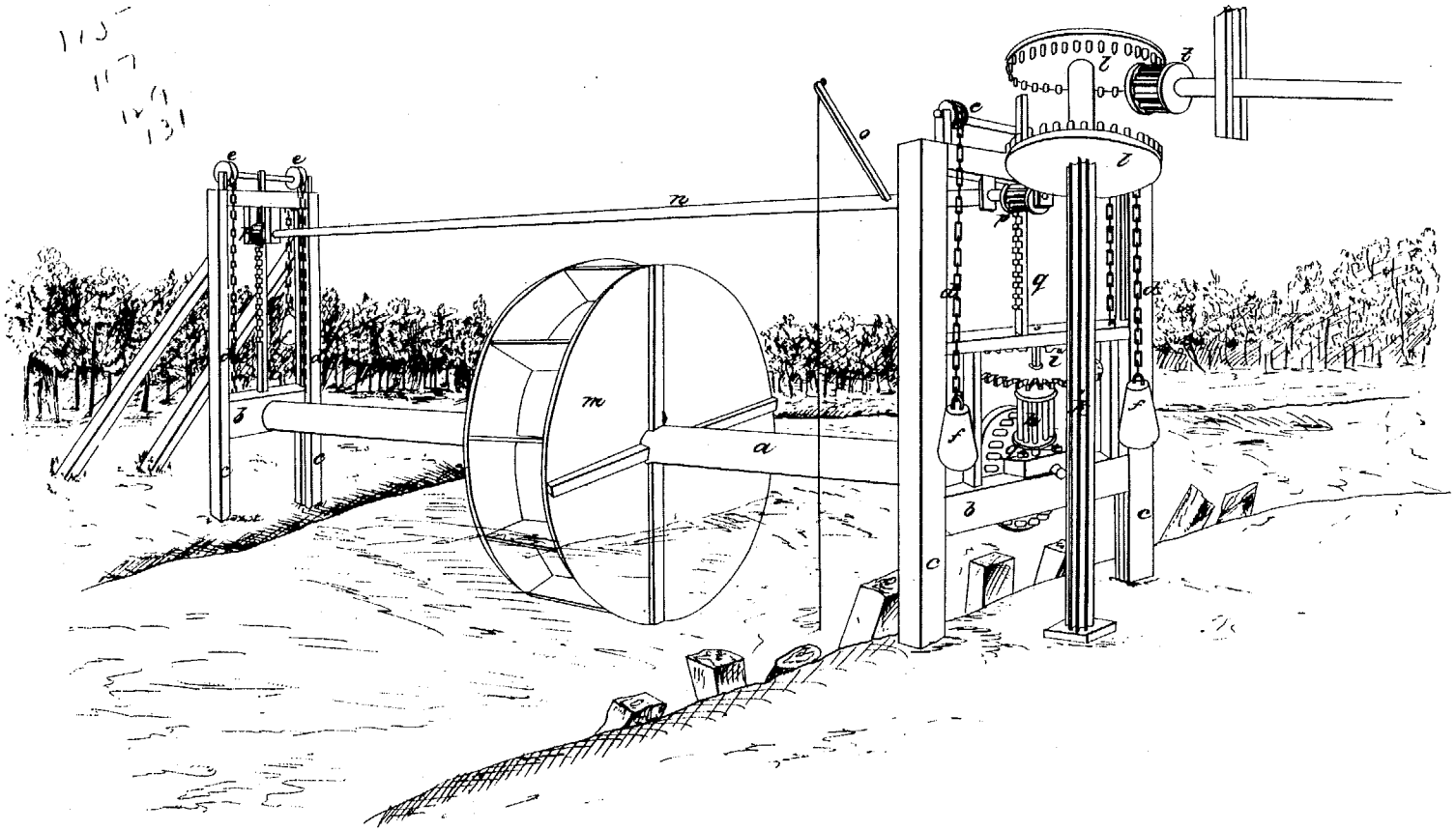
N. PETERS, PHOTO-LITHOGRAPHER, WASHINGTON, D. C.

7197X Aug. 10. 1832 529

James Bennett of Vigo Indiana
Letters Patent

The Schedule referred to in these Letters Patent and making part
of the same containing a description in the words of the said James
Bennett himself of his improvement in propelling Mills on Rivers by
force of the current or tide by a suspended water wheel & head block To all to whom these presents shall come: Be it known that I
James Bennett of the County of Vigo and State of Indiana have
invented a new and useful improvement in propelling mills
on Rivers by force of the current or tide by a suspended water
wheel, and head block, and that the following is a full and ex
act description of the construction and operation of the said ma-
chine as invented & improved by me.
The water wheel shaft may be 40 or 50 feet long, and to
lie horizontally across the Stream, the head blocks are to slide
between two posts at each end, which have ways for it to slide
in so that it may be raised or lowered as the water may require.
There are two large chains fastened to each head block and which
go up around or over the pulleys on the top of the frame which
the head blocks slide in and which have large weights at the end of them heavy
enough to balance the water wheel and head block, so as to make
the wheel stand whenever it is set.
On the end of the water wheel shaft there is a wheel with 40 or 50 cogs
in it which works in a wallower of 18 or 20 rounds which is,
on a shaft that stands on the head block, which works up and
down with the water wheel, and in this upright shaft above the
wallower there is a spur wheel with 50 or 60 cogs in it which is,
to work into a stationary shaft which is fluted from the bottom
up as high as the water wheel ever wants to be raised, and on
the top of the long upright shaft there is a spur wheel as large
as it will bear not to touch the chain or head block.
The water wheel may be from 16 to 20 feet high and should have 7197x Aug 10, 1832

6 or 8 Buckets and may be let into the water 5 or 6 feet deep & will work very well in a current that moves at the rate of two miles an hour. the water wheel is to be raised out of the water to stop the mill, by a lever which works in a roller having a wallower at each end, which roller is fastened on the same head blocks with the pulley shaft, and moves two small pieces of timber fastened in the head blocks beside the chain and which go up to the wallowers that are on the roller shafts and have cogs so as to work with them and by this lever the wheel is to be regulated fast slowly or stopping the mill and according to the different stages of the water. To work this suspended water wheel in in tide water which ebbs and flows have two cog wheels on the stationary shaft so far apart as to let a wallower be thrown out of one into the other and the mill will continue the same way.

The head blocks are made by two side pieces having double mortises in each end, about one foot from the end for the upper & lower head blocks to go through, and the end of the tenons to go through far enough to work on a groove for them to slide in

[illegible]
[illegible] Witnesses
Thos H Blake
Wm Lindly

James Bennett (700 Words)

(Granted August 10. 1832)